United States Patent [19]

Masaki

[11] Patent Number: 4,517,405

[45] Date of Patent: May 14, 1985

[54] COMPACT CONDUCTOR DEVICE

[75] Inventor: Nobuo Masaki, Fuchu, Japan

[73] Assignee: Tokyo Shibaura Denki Kabushiki Kaisha, Kawasaki, Japan

[21] Appl. No.: 381,448

[22] Filed: May 24, 1982

[30] Foreign Application Priority Data

Jun. 24, 1981 [JP] Japan ............................ 56-96474

[51] Int. Cl.$^3$ ............... H02G 5/00; H02B 1/20; H02B 13/06
[52] U.S. Cl. .................... 174/68 B; 174/146; 361/341
[58] Field of Search ............ 174/16 B, 68 B, 70 B, 174/71 B, 72 B, 88 B, 99 B, 99 E, 100, 146, 149 B, 171, 174, 175; 307/147; 361/336, 341, 342, 355, 361, 378

[56] References Cited

FOREIGN PATENT DOCUMENTS

| 902997 | 2/1954 | Fed. Rep. of Germany ... 174/149 B |
| 7034299 | 10/1971 | Fed. Rep. of Germany . |
| 7709147 | 7/1977 | Fed. Rep. of Germany . |
| 1158315 | 1/1958 | France ................................ 174/174 |
| 1162243 | 4/1958 | France ............................ 174/153 G |
| 2050885 | 4/1971 | France .............................. 174/99 E |
| 43-11582 | 5/1968 | Japan ............................... 174/99 E |
| 990203 | 4/1965 | United Kingdom .............. 174/99 B |

Primary Examiner—Laramie E. Askin
Attorney, Agent, or Firm—Finnegan, Henderson, Farabow, Garrett & Dunner

[57] ABSTRACT

A conductor device including a plurality of insulators, and a plurality of conductors extending mutually in parallel. Each of the conductors is supported at two positions spaced apart along the longitudinal direction thereof by a pair of the insulators. The conductor device also includes an insulating member provided intermediately along the longitudinal direction between the two supported positions of each of the conductors. The insulating member has a plurality of space portions along a side thereof, and the conductors are positioned in individual ones of the space portions. The widths of the space portions are dimensioned for providing gaps normally between the sides of the conductors and the sides of the space portions, the minimum width of each gap being sufficient to prevent leakage current between the positioned conductors and the insulating member and the maximum width of each gap being not greater than necessary to prevent plastic deformation of the conductors by bending of the conductors under electromagnetic force between the conductors.

7 Claims, 11 Drawing Figures

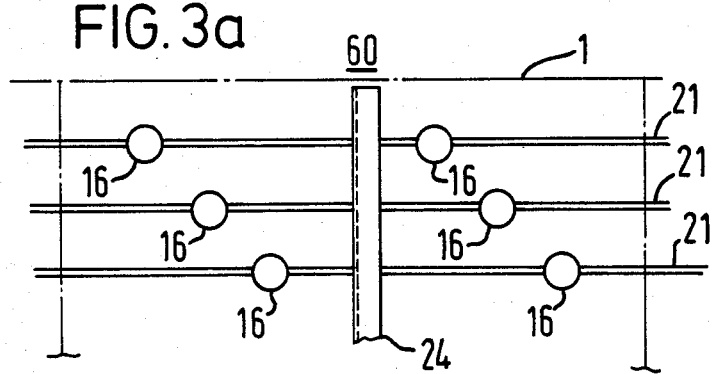
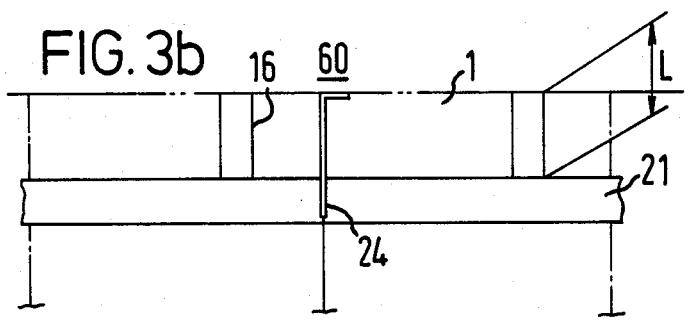
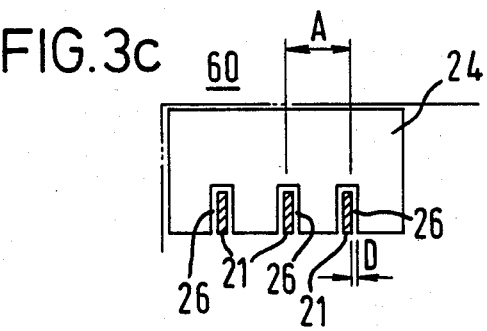

COMPACT CONDUCTOR DEVICE

BACKGROUND OF THE INVENTION

1. Field of the Invention

This invention relates generally to a compact conductor device which includes a plurality of conductors extending in parallel and spaced apart relationship with respect to one another, each conductor being supported by a pair of insulators spaced apart from one another along the longitudinal direction of the conductor, and an insulating member positioned along the lengths of the conductors between the support points of each of the conductors for maintaining the conductors in spaced apart relationship between the insulators.

2. Description of the Prior Art

First, a conductor device and an insulating member used in a metal-enclosed switchgear will be explained as an example. FIG. 1 shows a typical construction of a three phase three wipe type metal-enclosed switchgear. In FIG. 1, numeral 1 designates an enclosure, the internal space of which is separated, depending upon the type of the enclosure, by plates 30 into an equipment compartment 2, a power source compartment 3 and a load compartment 4. On the front side of the equipment compartment 2 and the power source compartment 3, doors 5 are provided. Numeral 6 designates a conductor device which includes three conductors 21 supported by insulators 16 such as epoxy insulators. Numerals 6A and numerals 7 (only one being shown) designate three branch conductors. Three current transformers 8 (only one being shown) are connected intermediately of the three branch conductors 7, respectively. A circuit breaker 11 with three circuit breaking portions (not shown) is encased in the equipment compartment 2. Three upper disconnecting devices 12 (only one being shown) are provided in the separating plate 30 between the equipment compartment 2 and the power source compartment 3.

Three lower disconnecting devices 13 (only one being shown) are provided in the separating plate 30 between the equipment compartment 2 and the load compartment 4. One end of each of the branch conductors 6A is connected to an individual conductor 21. Each other end of the branch conductors 6A is connected through the individual upper disconnecting device 12 to an individual first terminal of the circuit breaker 11. One end of each of the branch conductors 7 is connected through the individual lower disconnecting device 13 to an individual second terminal of the circuit breaker 11. Each other end of the branch conductors 7 is connected through an individual cable head 9 (only one being shown) to an individual load cable 10 (only one being shown).

From the viewpoint of economy, it is advantageous to reduce the size of the metal-enclosed switchgear. For this purpose, the reduction of spaces between the conductors constituting the main circuit of the switchgear is most effective.

FIGS. 2a, 2b and 2c show the conductor device 6 in the metal-enclosed switchgear shown in FIG. 1 in more detail. In the case of a three-phase power line, for example, three conductors 21 are extended in parallel so that the longer side in cross section of each rectangular conductor is disposed vertically in order to reduce the interphase distance A. For reinforcing the conductors 21, an insulating plate 20 having supporting grooves is provided. An intermediate portion of each conductor 21 between the insulators 16 is supported in the groove of the insulating plate 20 so that any plastic deformation of a conductor 21 caused by the electromagnetic force is thereby prevented. The intermediate portion of each conductor 21 may be supported tightly or loosely with tiny gaps in the groove of the insulating plate 20 depending on how to assemble the conductor device.

In this case, however, where it is assumed that the distance from the conductor 21 to ground along the surface of an insulator 16 is L, the distance M between two adjacent conductors 21 along the surface of the insulating plate 20 is expressed as follows, because of the difference between the phase voltage and the interphase voltage:

$$M = \sqrt{3} \cdot L$$

The creeping distance M is required for preventing power failure regardless of deposition of dirt or collection of humidity on the insulating plate 20, and maintaining the relation of $M = \sqrt{3} \cdot L$ is essential from the viewpoint of insulation coordination. In other words, the interphase distance A between the conductors 21 supported by the insulating plate 20 cannot be reduced less than the height B of the insulator 16 under the prior art. Of course, the height B of the insulator 16 is so selected that the aforementioned creeping distance L can be effectively provided.

Since the creeping distance M larger than $\sqrt{3}$ times the distance L from the conductor to ground along the surface of the insulator must be maintained under the prior art between the conductors 21 supported against the interphase voltages, there is a limitation in reducing the interphase distance A. As a result, the size of the switchgear cannot be economized regardless of the limitation under the prior art.

SUMMARY OF THE INVENTION

Accordingly, one object of this invention is to provide a conductor device which can reduce the distance between conductors.

Another object of this invention is to provide an improved conductor device which continues to prevent the plastic deformation of the conductors due to the electromagnetic force.

Still another object of this invention is to provide a conductor device which can reduce the size of a metal-enclosed switchgear or the like.

These and other objects of this invention can be achieved by providing a conductor device including a plurality of insulators, and a plurality of conductors extending mutually in parallel. Each of the conductors is supported at two positions spaced apart along the longitudinal direction thereof by a pair of insulators. The conductor device also includes an insulating member provided intermediately along the longitudinal direction between the two supported positions of each of the conductors. The insulating member has a plurality of space portions along a side thereof, and the conductors are positioned in individual ones of the space portions. The widths of the space portions are dimensioned for providing gaps normally between the sides of the conductors and the sides of the space portions while preventing plastic deformation of the conductors by bending of the conductors under electromagnetic force between the conductors.

According to this invention there is further provided an insulating member for installation across a plurality of parallel, spaced apart conductors of a predetermined width. The insulating member includes a substantially planar insulating plate having a plurality of space portions along a side thereof for receiving therein the conductors. The space portions are dimensioned with a width for providing gaps normally between the sides of the conductors and the sides of the space portions while preventing plastic deformation of the conductors by bending of the conductors under electromagnetic force between the conductors.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIGS. 3(a), 3(b) and 3(c) are a plan view, a front view and a side view of a conductor device according to a preferred embodiment of this invention, respectively;

DESCRIPTION OF THE PREFERRED EMBODIMENTS

Figure 1:
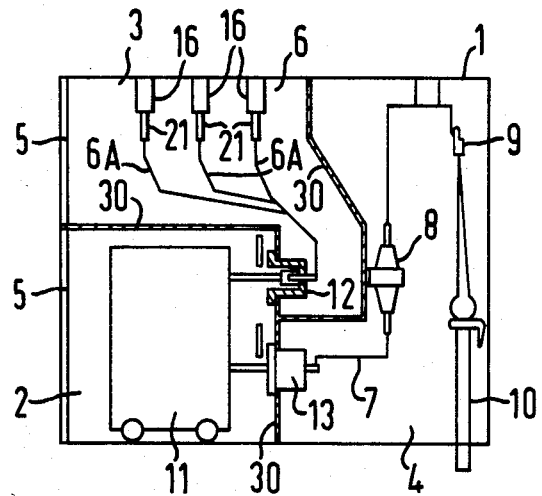
FIG. 1 is a diagram showing a construction of an ordinary metal-enclosed switchgear.
Figure 2A:
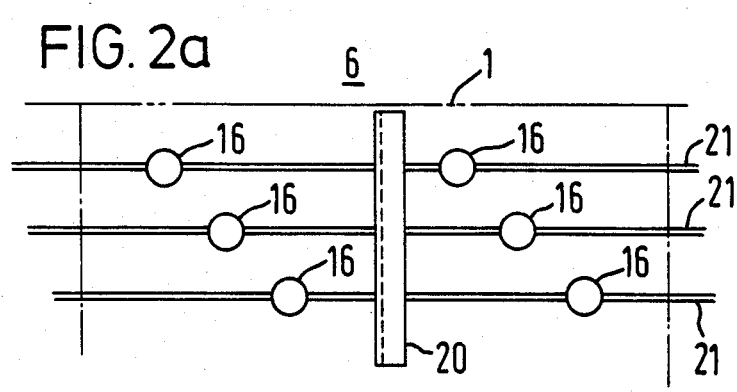
FIGS. 2(a), 2(b) and 2(c) are a plan view, a front view and a side view of a conventional conductor device in the metal-enclosed switchgear shown in FIG. 1, respectively.
Figure 2B:
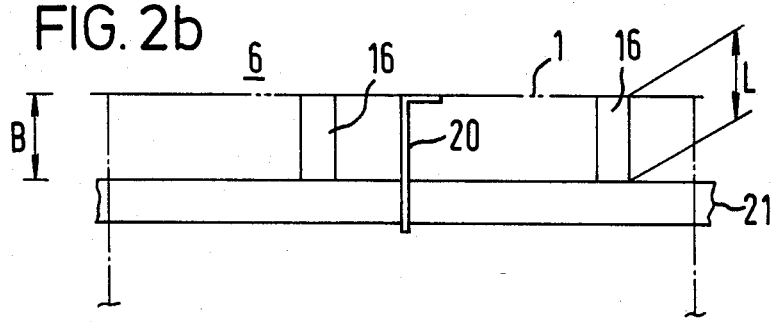
Figure 2C:
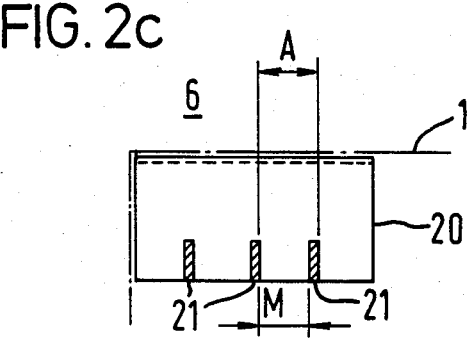

An embodiment of this invention will now be described in detail with reference to FIGS. 3a, 3b and 3c, wherein like reference numerals designate identical or corresponding parts throughout the several views. In a conductor device 60 shown in these figures, there is provided an insulating member 24 instead of the insulating plate 20 in FIGS. 2a, 2b and 2c. In the embodiment shown in FIGS. 3a-3c, conductors 21 are extended, as in the conventional conductor device 6, to be mutually in parallel with a longer side in cross section thereof being disposed vertically, and are supported by the epoxy insulators 16. Furthermore, an intermediate portion along its length of each conductor 21 is received in each of space portions, such as groove portions 26, formed in the insulating member 24 of a planar configuration. Within the groove portion 26 formed in the insulating member 24, a gap D is maintained between the outer surface of the conductor 21 and inner corresponding portions of the insulating member 24 at least surrounding the conductor 21.

The gap D is selected as follows. Ordinarily, when an external force is applied transversely to a conductor at an intermediate portion thereof between the two fixed ends, the conductor will be bent in the transverse direction. Where the amount of bending is less than a predetermined value (determined by the length of the conductor measured between the fixed ends, and the size of the conductor), the conductor returns to the original linear configuration upon removal of the external force, by the resilience of the conductor. However, where the amount of bending exceeds the predetermined value, a plastic deformation occurs, and the conductor does not return to its original configuration even when the external force is removed. The maximum gap D is so selected that the bending amount of each conductor due to the interphase electromagnetic force can be thereby regulated in a range not producing any plastic deformation. On the other hand the minimum gap D is so selected that leakage current does not flow between the conductor 21 and the insulating member 24, namely no partial discharge occurs therebetween, which is apparent to those skilled in the art.

Since the conductor device 60 shown in FIGS. 3a-3c is constructed as described above, in the normal operation the insulating member 24 is not brought into contact with the conductors 21 and substantially no leakage current flows along the surface of the insulating member 24. Therefore any possibility of causing flashover fault due to deposition of dirt or accumulating humidity can be thereby prevented. Futhermore, since the amount of bending transversely of the conductor 21 by the interphase electromagnetic force can be restricted within the gap D by the insulating member 24, no plastic deformation occurs in the conductor 21. In other words, the bending of conductor 21 is restricted within its elastic range, and the conductor 21 is brought back to the original condition having the gap D upon removal of the interphase electromagnetic force.

In the conductor device 60 described above, the distance A between the conductors 21 can be selected to be a value not determined by the creeping distance along the insulating member 24, but determined by the insulating characteristics through air between the conductors 21. Ordinarily, the creeping distance (or leaking distance) along the surface of the insulating member 24 has been selected to be a value greater than the distance determined solely by the insulating characteristics through air, in consideration of dirt or dust or accumulating humidity. However, in the conductor device according to the present invention, the insulating member 24 is not in direct contact with the conductors 21, and therefore the distance between the conductors can be selected solely in consideration of the interphase insulation characteristics through air. As a result, the interphase distance A in the conductor device 60 shown in FIGS. 3a-3c can be reduced to approximately $\frac{2}{3}$ of the corresponding value in FIGS. 2a-2c. Furthermore, the plastic deformation of the conductors caused by the electromagnetic force can be prevented, and by applying the invention to the metal-enclosed switchgear, the size of the switchgear can be substantially reduced.

Figure 4:
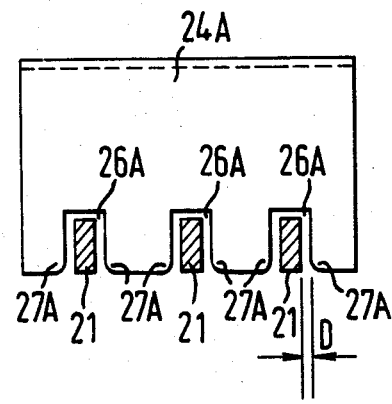
FIGS. 4, 5 and 6 are side views of insulating members according to another embodiment of this invention, respectively.
Figure 5:
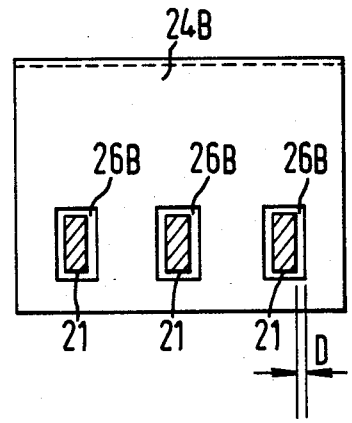
Figure 6:
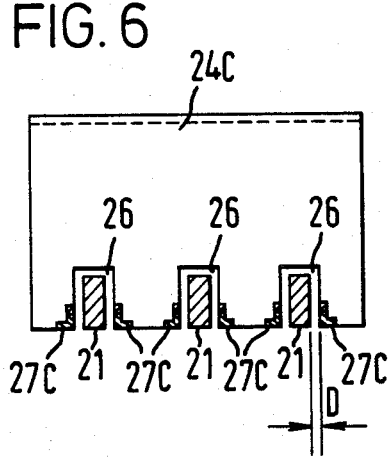

It should be noted that the shape of the insulating member is not limited to that of the insulating member 24 shown in FIGS. 3a-3c. FIG. 4 shows an insulating member 24A according to another embodiment of this invention. In FIG. 4, edge portions 27A around groove portions 26A in the insulating member 24A provided for receiving the conductors 21 are rounded to modify an electrical measurement of the gap D. FIG. 5 shows an insulating member 24B according to still another embodiment of this invention. In FIG. 5, the insulating member 24B includes three elongated through hole portions 26B as the space portions. When it is required, edge portions 27C of an insulating member 24C may be reinforced by a metal or the like, as shown in FIG. 6.

Figure 7:
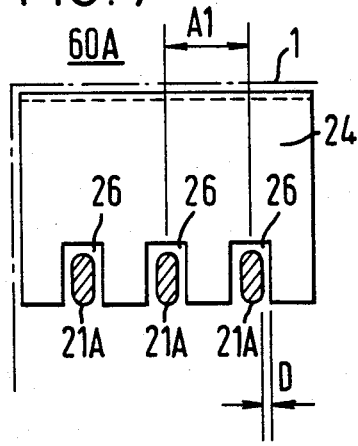
FIG. 7 is a side view of a conductor device according to another embodiment of this invention.

FIG. 7 shows a conductor device 60A according to another embodiment of this invention. In FIG. 7, rounded edge conductors 21A are used instead of the conductors 21, cross section of which is rectangular, in the conductor device 60A. The interphase distance A1 between the rounded edge conductors 21A in the conductor device 60A can be reduced to approximately a half of the interphase distance A in the conductor device 24 shown in FIGS. 2a, 2b and 2c.

According to this invention, the distance between the conductors can be substantially reduced and a possibility of causing a plastic deformation of the conductors due to an electromagnetic force can be substantially eliminated. Therefore the size of a metal-enclosed switchgear, wherein the conductor device according to this invention is used, can be substantially reduced.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A compact conductor device comprising:
    a plurality of conductors of a predetermined size extending mutually in parallel, said conductors being spaced apart from one another by a minimum interphase distance A that is sufficient to prevent any electrical interflow through the air separating the conductors;
    a plurality of insulators;
    each of said conductors being supported at two predetermined points by a pair of said insulators spaced apart from each other along the longitudinal direction of the conductor, each conductor because of its size, inherent properties and the predetermined points of support having a maximum bending point beyond which plastic deformation of the conductor will occur;
    an insulating member positioned along the length of said conductors and between said two support points of each of said conductors, said insulating member having a plurality of space portions along a side thereof, said conductors being positioned in individual ones of said space portions;
    the widths of said space portions being dimensioned for providing air gaps normally between the sides of said conductors and the sides of said space portions, the width of each gap (1) being large enough to prevent leakage of current between the positioned conductor and the adjacent insulating member so that the minimum distance A between the conductors can be selected solely in consideration of the insulating characteristics through air between the conductors, rather than by the insulating characteristics through the insulating member, and (2) being less than the maximum bending point beyond which the plastic deformation of the respective conductor occurs so that if a conductor is bent by an electromagnetic force created between the conductors, the conductors will return to their original positions when such an electromagnetic force is withdrawn; and
    said predetermined points of support being selected so that the maximum bending point of each of said conductors is less than the respective gap between each respective conductor and the adjacent insulating member.

2. The conductor device according to claim 1, wherein:
    said insulating member has a plurality of through-hole portions as said plurality of space portions.

3. The conductor device according to claim 1, wherein:
    said insulating member has a plurality of groove portions as said plurality of space portions.

4. The conductor device according to claim 3, wherein edge portions around said groove portions of said insulating member are rounded.

5. The conductor device according to claim 3, wherein a metal member is provided at the edge portions of said insulating member.

6. The conductor device according to claim 1, wherein:
    said plurality of parallel conductors include three conductors corresponding to those of a three phase electric power system.

7. The conductor device according to claim 1, wherein: said conductors are rounded edge conductors.

* * * * *